Sept. 3, 1957 E. A. NOWAK 2,804,963
GLASSWARE HANDLING MECHANISM
Filed March 24, 1955 4 Sheets-Sheet 1
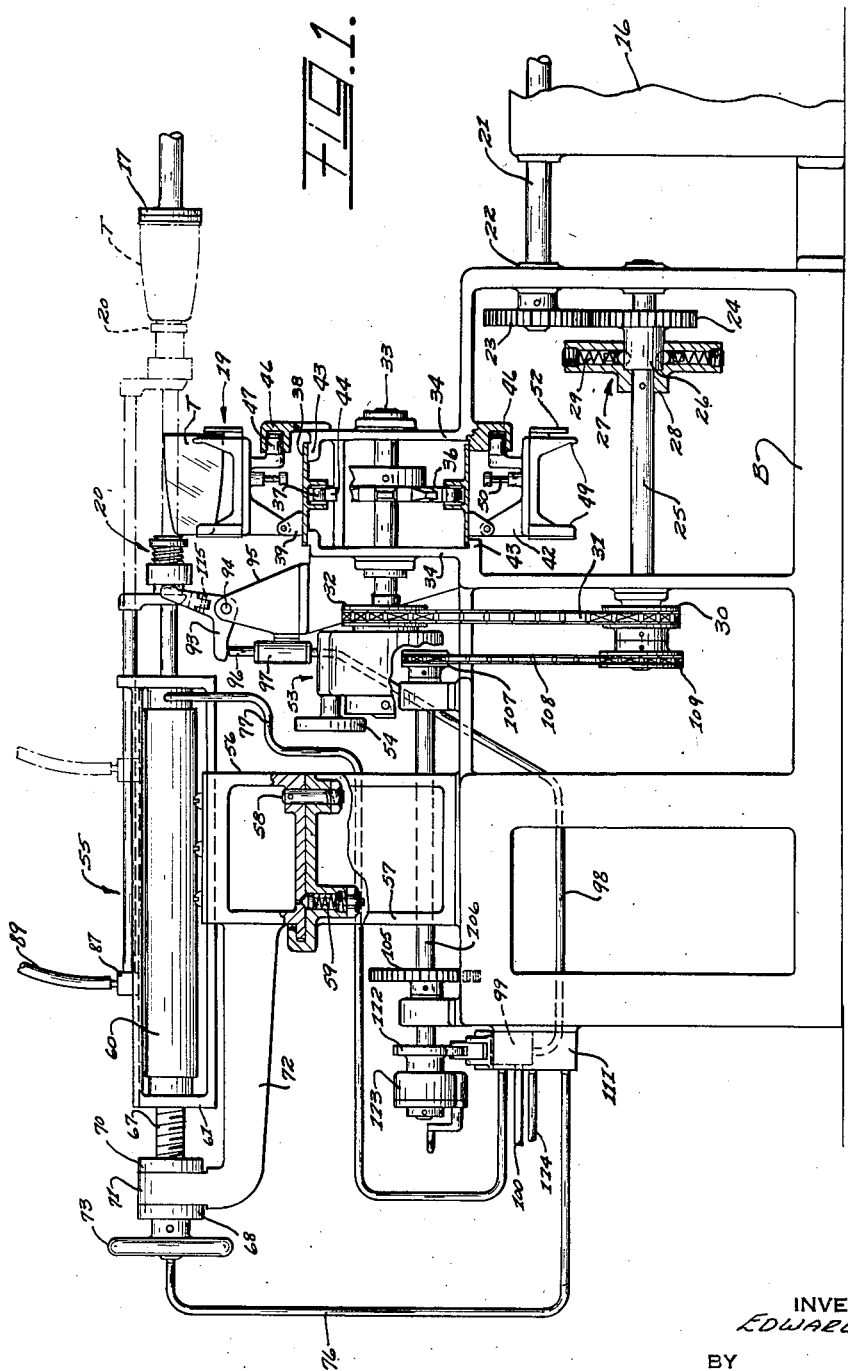
INVENTOR
EDWARD A. NOWAK
BY
Rule & Hoge
ATTORNEYS

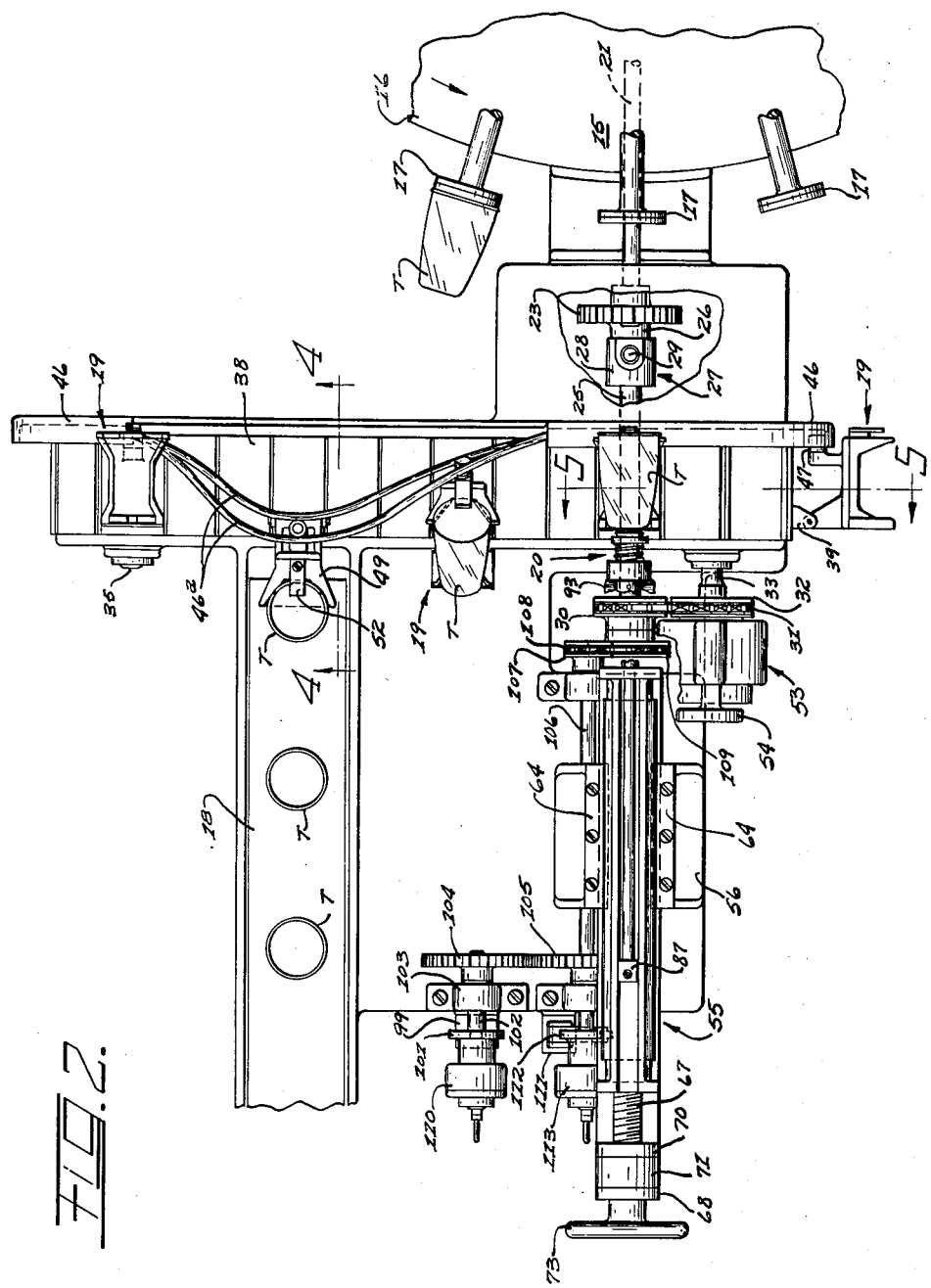

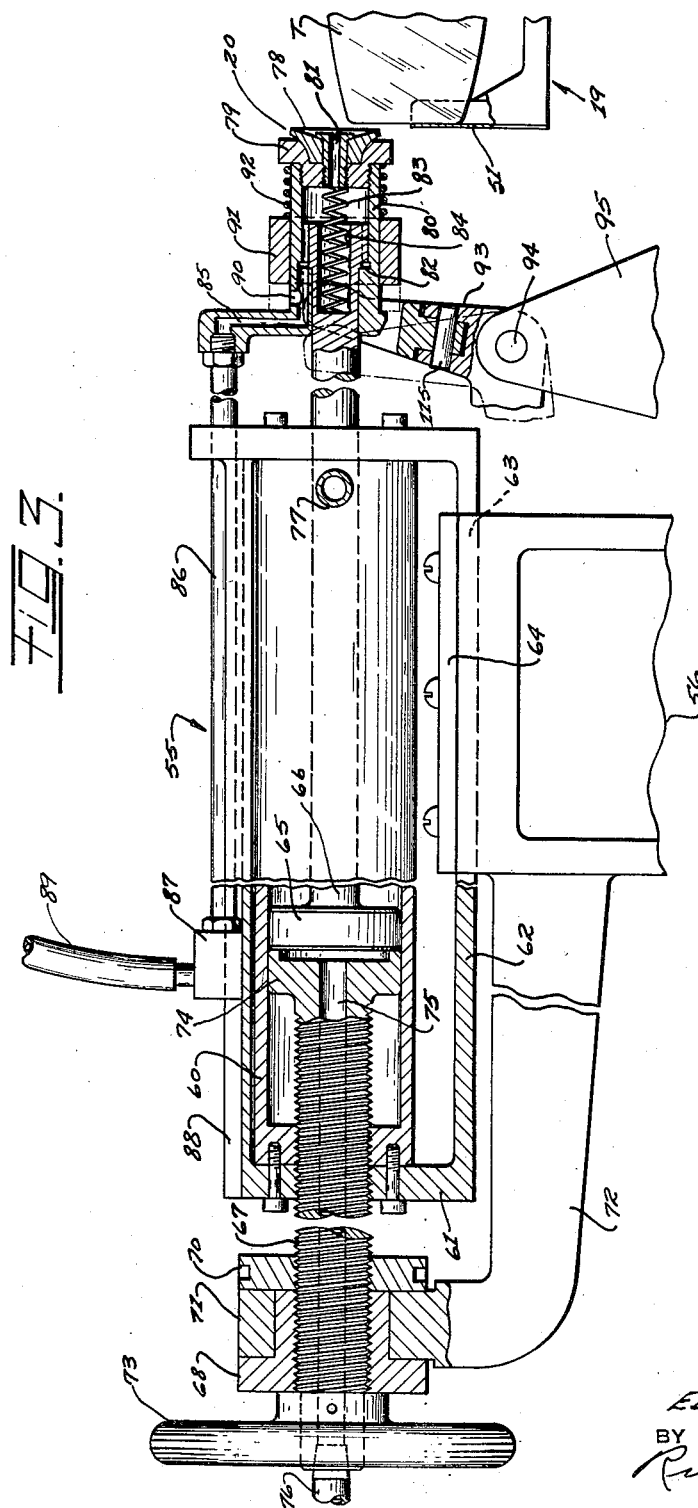

Sept. 3, 1957     E. A. NOWAK     2,804,963
GLASSWARE HANDLING MECHANISM
Filed March 24, 1955     4 Sheets-Sheet 4
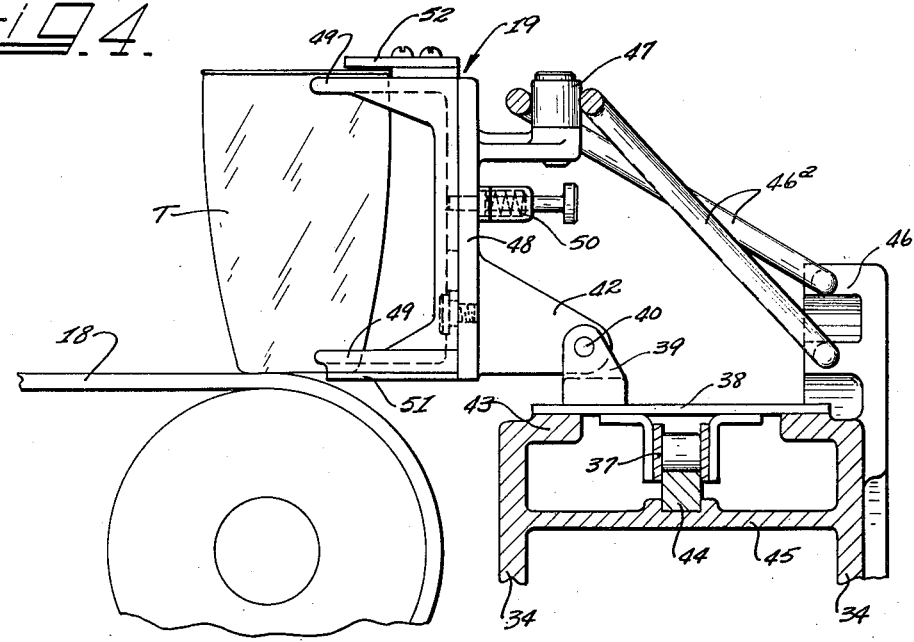
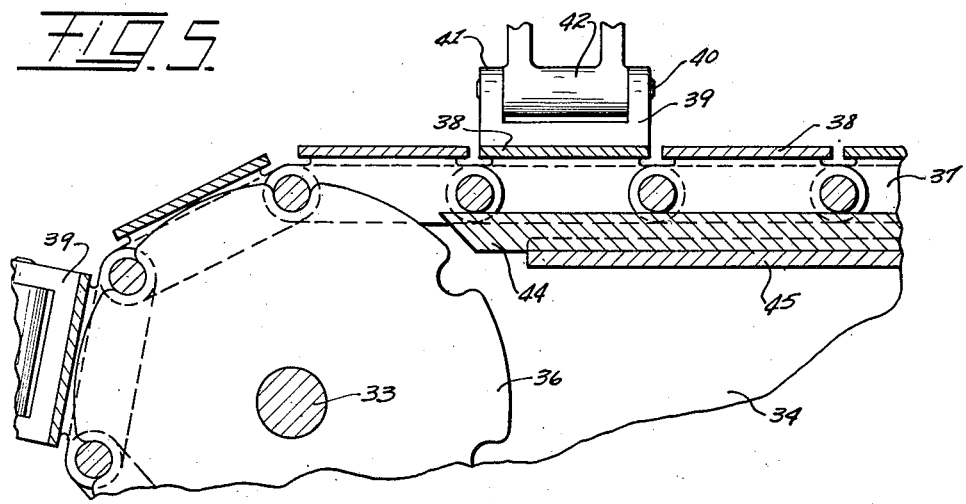
INVENTOR
EDWARD A. NOWAK
BY
Rule & Hoge
ATTORNEYS

United States Patent Office 2,804,963
Patented Sept. 3, 1957

2,804,963

GLASSWARE HANDLING MECHANISM

Edward A. Nowak, Toledo, Ohio, assignor to Owens-Illinois Glass Company, a corporation of Ohio Application March 24, 1955, Serial No. 496,495

4 Claims. (Cl. 198—33)

The present invention relates to glassware handling mechanism and more particularly to means for transferring tumblers and like articles of glassware from a decorating machine or such apparatus to a conveyor which carries the articles to an annealing or decorating leer.

One important object of my invention is the provision of novel handling mechanism which will function to transfer tumblers or such articles as explained above, without bringing the handling mechanism or any part thereof into contact with decorative material that has been applied to the exterior surface of the articles. As a consequence, the probability of smearing or smudging the freshly applied coloring material is practically negligible.

Another object of my invention is the provision of mechanism of the above character which incorporates novel adjusting devices whereby to compensate for differences in the length of the articles being handled.

A further object of my invention is the provision of a novel form of vacuum chuck and vacuum control means associated therewith, such chuck being adapted for holding engagement with the base portion of the article or articles being transferred.

A still further object of my invention is the provision of an air operated piston motor for supporting and actuating the vacuum chuck and the provision in such a structure, of means for axially adjusting the motor cylinder independently of its piston, piston rod, and the vacuum chuck whereby the outermost position of the chuck may be varied to compensate for differences in the length of the articles being handled while the innermost or transfer position of the chuck remains unchanged. Thus, by adjusting the cylinder axially it is possible to predetermine the outermost position of the chuck as required by the particular article being handled without in any manner varying the innermost position of this chuck at which articles are released for gravity transfer to cradles.

It is also an object of my invention to incorporate in the apparatus, a safety feature which will permit lateral movement of the vacuum chuck and piston motor from its normal operating position in the event the chuck fails to retract axially out of the path of travel of the holders from which the chuck is intended to remove tumblers or the like articles of glassware.

Other objects will be in part apparent and in part pointed out hereinafter.

In the drawings:

Fig. 1 is a side elevational view with parts in section illustrating my invention;

Fig. 2 is a plan view thereof with parts broken away;

Fig. 3 is a detail side elevational view with parts in section of the piston motor and vacuum chuck;

Fig. 4 is a detail sectional elevational view taken substantially at the line 4—4 of Fig. 2; and Fig. 5 is a detail sectional view taken substantially at the line 5—5 of Fig. 2.

Although my invention is illustrated herein in association with a glassware decorating machine and functions to remove tumblers from the latter and transfer them to a conveyor designed to carry such articles to a decorating leer, it is obvious that the apparatus may well be used in other associations.

In the present embodiment of my invention it is arranged at the take-out station 15 of a rotary decorating machine 16, the latter comprising an annular series of holders 17, which, mechanically or by vacuum, support glass tumblers T or like articles with their axes extending radially and their bottom ends disposed outwardly for contact with a vacuum transfer cup as will be described presently. The decorating machine which may well be the type disclosed in Patent #2,484,671 issued October 11, 1949 to T. S. Bauman, is rotated intermittently in such fashion that the holders bring the tumblers in succession to one or more decorating stations (not shown) where paint or some suitable coloring material is applied as a design to the exterior surface of these articles. Ultimately these article holders 17 reach the take-out station 15 where they are held stationary momentarily while the transfer mechanism removes the tumblers T therefrom and then deposits them upon cradles, by means of which they are carried to and placed upon an endless continuously moving conveyor 18 which in turn transfers them to a decorating or annealing leer.

Briefly, the transfer mechanism comprises an endless series of tiltable cradles 19 to which the tumblers are transferred from the holders 17 by means of a vacuum transfer chuck 20, the latter being mounted for reciprocation along a horizontal axis momentarily coincident with that of successive tumblers and holders, while the latter are at the transfer station, whereby to bring such chuck into holding engagement with the bottom of the tumblers. Immediately upon making contact with a tumbler, the air is exhausted from the chuck, thereby effecting holding engagement between the two members. Thereafter the chuck is retracted and at the end of this retractive stroke the vacuum is broken to permit gravity delivery of the tumbler to the waiting cradle 19 which at this time is directly below the fully retracted position of the transfer chuck. The cradle, after receiving the tumbler, is moved in step by step fashion to the receiving end of the aforementioned conveyor 18 and during such movement, is tilted so that the tumbler which was in a recumbent position at the point of initial placement upon the cradle, gradually assumes a normal upright position and in such relationship to the conveyor 18 that the latter contacts the bottom of the tumbler and positively sweeps it from the cradle. These tumblers, as explained before, are then carried by the conveyor 18 to the decorating leer. This vacuum transfer chuck 20 is supported upon and operated by a piston motor which incorporate adjustable means to vary the outermost position of the chuck and thereby compensate for variations in the length of the tumblers or other articles being transferred. The fully retracted position of the chuck remains constant. Additionally, this piston motor and chuck unit are mounted to swing about a vertical axis whereby to permit lateral movement of said chuck out of the path of the rotating holders 17, should the motor fail to retract the chuck in the desired fashion.

The transfer mechanism comprises a base B positioned at one side of the decorating machine 16 or some such machine from which tumblers or like articles are to be removed for transfer to an annealing leer.

This mechanism, very obviously, must be operated in synchronism with the decorating machine 16 and to this end they are tied together by means including a horizontal drive shaft 21 which receives its power from the decorating machine driving means (not shown). This drive shaft 21 is journaled in a bearing 22 in said base B and carries a gear 23 which runs in mesh with a gear 24, the latter being supported upon a counter shaft 25. This gear 24, which is free to rotate upon said shaft 25, carries a hub 26 which comprises part of a slip-clutch 27, the latter also including a hub 28 which is pinned or otherwise secured to the counter shaft 25. Spring pressed detents 29 provide the releasable connection between the two clutch members. At that end of the counter shaft 25 remote from the clutch is mounted a sprocket 30 over which is trained a sprocket chain 31, the latter extending generally upward and trained over a second sprocket 32 which is secured to a horizontal shaft 33, the latter being journaled in interconnected frame members 34 which carry the aforementioned cradles 19. This shaft 33 has its counterpart 35 at the opposite end of the frame members 34 (Fig. 2), these shafts each supporting a sprocket wheel 36 over which is trained a sprocket chain 37, the latter carrying a plurality of holders 38 for the aforementioned cradles 19.

These holders 38 are, in the illustrated embodiment thereof, rectangular plates provided near one end with a bracket 39 to which the corresponding cradle 19 is pivoted by means of a hinge pin 40 which extends through upstanding ears 41 of said bracket and a bifurcated arm or finger 42 which in part is positioned between said two ears 41. The opposed ends of these cradle holders 38 ride upon supporting rails 43 which form a part of the frame members 34 referred to above. For the purpose of preventing any lateral shifting of the upper reach of the cradle holders 38 as they move the cradles from the tumbler receiving station to the conveyor 18, I provide guide means (Figs. 1, 3 and 4) consisting of a guide rail 44 which is mounted upon a support 45 and has its upper portion snugly but slidably received in the space between the two side members of the sprocket chain 37. Thus it is apparent that the cradle holders are firmly held against any lateral movement and when the cradles are positioned upright over the receiving end of the conveyor 18, as shown in Fig. 4, the base portion of the tumblers or such articles can immediately be engaged by the conveyor. It is apparent that if these cradle holders were not firmly held against lateral shifting they might possibly move to one side to such an extent that when the cradles are uprighted they would not position the tumblers so that the conveyor 18 could not contact and remove them from the cradles. This is thought to be quite apparent by reference to Fig. 4 of the drawings.

For the purpose of controlling the position of the cradles 19 in relation to their holders, I have provided a closed channel-like guide 46 which is carried by one of the main frame members 34 (Figs. 1 and 4), such guide member designed to accommodate a guide roller 47, one of which is carried by each cradle. This guide member 46 (Figs. 2 and 4), assumes the form of a pair of suitably curved rods 46a, the curvature of which is such as to insure tilting of the cradles from a recumbent position to a normal upright position at the receiving end of the conveyor 18 and thence to a recumbent position shortly after the removal of tumblers or such articles and the transfer of same to said conveyor 18.

Each cradle 19 may well comprise a base 48 which carries the aforementioned bifurcated arm 42 and releasably supports the U-shaped receivers 49, the latter being connected together and separably secured to the base 48 by means of a spring pressed detent 50. Thus the receivers 49 can be replaced quite readily, as circumstances require. At the base end of the receiver unit is a supporting plate 51 upon which the tumbler or such article rests during the latter stages of the cradle tilting movement and until the conveyor 18 mechanically removes the tumbler from the cradle. At the upper end of each cradle is a forwardly projected finger 52 which cooperates with the aforementioned supporting plate 51 to prevent premature removal of the tumbler or such article.

For the purpose of effecting accurate initial positioning of the cradles so that they are in proper alignment with the tumbler holders 17 at the time the latter arrive at the take-out stations 15, I have provided an adjusting unit 53 (Figs. 1 and 2), which is directly connected to the sprocket carrying shaft 33 and includes a hand wheel 54 through the manipulation of which manual adjustment of the cradle position may be effected.

The mechanism for operating the previously mentioned vacuum transfer chuck 20 includes an air operated piston type motor 55 which is mounted upon a carriage 56, the latter being supported upon a pedestal 57 and capable of being oscillated thereon in a horizontal plane about a vertical hinge pin 58. A spring pressed detent 59 normally and releasably holds the aforementioned parts in such relative positions that the axis of the piston motor 55 and chuck 20 will coincide with the axis of tumblers or such articles when they are brought to a standstill at the pick-up station by means of the holders 17.

This piston motor 55 includes a horizontal cylinder 60 which is rigidly mounted in a frame 61, the latter including a base 62 which is slidably mounted in a slide way 63 in the upper side of the aforementioned carriage 56. Plates 64 or gibs secure the base 62 in said slide-way. Within the motor cylinder 60 is a piston 65 and piston rod 66, the latter extending forwardly through one end of the cylinder and the frame 61, said piston rod at its outer end supporting the vacuum transfer chuck 20. It is obvious that the relationship between the transfer chuck 20 and a cradle, when the former is in its fully retracted position for the purpose of depositing tumblers in the cradles should remain constant. On the other hand, the outermost or tumbler pick-up position of necessity must be capable of adjustment to compensate for differences in the axial dimension of the articles being transferred. In other words, if the tumbler should be shorter than that shown, it is obvious that the transfer chuck 20 must be moved outwardly beyond the point at which it can pick up the tumblers illustrated in the drawings. In such event, however, it is also obvious that the inner end of the retractive stroke must remain unchanged, irrespective of the location of the article pick-up point. Accordingly the structure includes an adjusting screw 67 which is threaded in a flanged collar 68 which is clamped to said rod by means of a lock nut 70, Fig. 3, so that the collar and lock nut rotate as a unit with the adjusting screw in a bearing 71 at the outer end of an arm 72 which is supported on the aforementioned carriage 56. An adjusting hand wheel 73 is secured to the outer end of this screw 67 and there is a stop 74 at the inner end of said screw designed for engagement with the piston 65 when the transfer chuck 20 is in its fully retracted position. The adjusting screw is formed with an axial bore 75 providing a conduit for the introduction of air or other fluid under pressure for the purpose of advancing the chuck 20 to the article pick-up station. This bore is connected to an air or fluid supply pipe 76. It will be apparent that rotation of the adjusting screw 67, since it is threaded in the adjacent end of both the cylinder 60 and frame 61, effects axial movement of the cylinder and frame in one direction, or the other, as determined by circumstances, yet it does not effect any degree of axial movement of the stop 74 relative to the carriage 56. Thus, the fully retracted position of the piston 65 and transfer chuck 20 remains unaffected and unchanged. Air under pressure is supplied to the front end of the motor cylinder by way of a supply pipe 77, which, as does the other supply pipe 76, leads to suitable control valves as will be described presently.

The transfer chuck 20 (Fig. 3), comprises a rubber disc 78 or suction cup of concavo-convex form suitably mounted in a holder 79 which in turn is threaded into the outer end of a tube 80 into the opposite end of which the piston rod 66 is telescoped. The suction cup 78 and holder 79 therefore are provided with an axial opening 81 leading to the interior of said cylinder 80 so that the chuck may be vacuumized in a fashion which will be apparent presently. This cylinder 80 is capable of limited axial movement upon the piston rod 66, such movement being restricted through the provision of inter-engagable abutments 82 or shoulders. A coil spring 83, mounted in part in an axial recess 84 in the outer end of the piston rod 66 and bearing against the inner end of the disc holder 79 functions to yieldably project the suction cup 78 to the maximum degree possible in relation to the rod 66. This cylinder 80 is provided with a vacuum conduit 85 which in turn is connected to a rigid pipe 86 arranged alongside the upper side of the frame 61. At the inner end of this pipe 86 it is connected to a slide block 87 which is mounted in and movable along a guideway 88 in the upper side of said frame 61. This slide 87 is chambered and connected to a main vacuum supply pipe 89 which leads to any suitable source of vacuum supply (not shown). A vacuum vent opening 90 in the cylinder 80 is closable by means of a sleeve valve 91 which encircles the aforementioned cylinder 80 and normally is held in position to close the vacuum vent opening 90 by means of a coil spring 92 which is interposed between said sleeve valve and the holder 79 for the suction cup 78.

Since it is necessary to break the vacuum upon completion of the retractive movement of the transfer chuck 20 to permit gravity deposit of the tumbler in one of the cradles 19, provision is made for moving the sleeve valve 91 in opposition to the spring 92 so as to open the vacuum conduit 85 to the atmosphere by way of said vent 90. This is accomplished by means of a bell crank 93 (Figs. 1 and 3), which is pivoted to a horizontal hinge pin 94 at the upper end of a supporting bracket 95. One end of this bell crank is bifurcated to straddle the cylinder 80 when the latter approaches its fully retracted position while the other end of this bell crank is positioned in contact with a push rod 96 which forms a part of a small air motor 97 to which air under pressure is supplied by way of a pipe 98 the latter leading to a control valve 99. A main supply pipe 100 is connected to said valve. This valve 99 is opened and closed at proper intervals by means of a cam 101 carried by a shaft 102, the latter being journaled in a bearing 103 and connected to a gear or pinion 104, the latter running in a mesh with another gear 105 which is mounted upon shaft 106. A sprocket 107 carried by this shaft 106 has a sprocket chain 108 trained thereover, the latter extending downwardly to a point where it is trained over another sprocket 109 which is pinned to the aforementioned counter shaft 25. A timer 110 of conventional type is provided to set the cam 101 at the proper operating position.

The flow of air under pressure to the opposite ends of the piston motor 55 in alternation is controlled by a valve 111 to which both of the pipes 76 and 77 are connected. A cam 112, which is rotated by means of the previously mentioned gear 105 and shaft 106, automatically opens and closes this valve 111 in timed relation to operation of the other associate devices. A timer 113 is operable to set the cam 112 as may be required. A main supply pipe 114 conducts air under pressure to the above mentioned control valve 111.

Since it is possible that on occasion the transfer chuck 20 may be in a position to interfere with the normal forward motion of the tumbler holders 17, I have provided means whereby, if such interference develops, there will be no serious damage to the mechanism. To this end in addition to providing for horizontal swinging movement of the carriage 56 and structure supported thereon about the hinge pin 58, I have also constructed the bell crank 93 so that the bifurcated end, which straddles the cylinder 80, is connected by means of a hinge pin or pivot pin 115 to the bell crank proper. Thus, if the transfer chuck should be struck by any portion of the decorating machine, the carriage 50 will swing about the pivot pin 58 and the bifurcated portion of the bell crank will also pivot about the pin 115 and permit the chuck 20 to move out of the path of traveling of the tumbler holders 17.

In operation, it is understood that although the decorating machine operates intermittently in that it moves in a step-by-step fashion to bring the holders 17 to the transfer station 15, the mechanism in the transfer apparatus operates continuously. The cradles 19 move in succession to the tumbler receiving position where the transfer chuck 20, which has picked up a tumbler and conveyed it to a position directly over the cradle, drops the tumbler into the cradle while the latter is moving. Immediately upon being so positioned, the valve 99 is opened to permit flow of air under pressure to the bell crank actuator so that the bell crank lever moves the sleeve valve 91 and breaks the vacuum in the suction cup 78, thereby permitting the tumbler to fall by gravity into the cradle. The curved guide rails 46a gradually tilt each cradle until it is in a normal upright position when it arrives at the receiving end of the conveyor 18. Thereupon, the conveyor actually engages the bottom of the tumbler or other article and removes it from the supporting cradle. As has been pointed out previously, rotation of the hand wheel 73, Figs. 1 and 3, provides simple and effective means for regulably controlling the outermost position of the transfer chuck whereby to compensate for differences in the length of tumblers or such articles which are being transferred.

Modifications may be resorted to within the spirit and scope of the appended claims.

I claim:

1. Apparatus for removing hollow glass articles from a holder and transferring them to a conveyor, such articles while in the holder being positioned with their longitudinal axis extending horizontally, a vacuum chuck mounted for reciprocation horizontally between an article pick-up station in which said chuck engages the bottom of the article and a transfer station, an air-operated piston motor supporting and actuating said chuck and disposed coaxially with the article in the holder, a valved vacuum connection to the chuck operable in response to actuation of the motor for regulating the exhaust of air from the chuck, an endless series of cradles movable intermittently to said transfer station and a discharge station, means whereby each cradle as it travels from the transfer station to the discharge station is moved from a recumbent position to an upright position and a conveyor operable to positively remove articles from the upright cradles at the discharge station.

2. In apparatus of the character described, transfer means comprising a piston motor having its axis disposed horizontally, said motor including a cylinder, a piston, and piston rod within said cylinder, said rod projecting through one end of the cylinder, a vacuum chuck mounted upon the outer end of the piston rod and including a suction cup, a holder for the cup, a tube supporting both the holder and the suction cup and telescoped over the end of said piston rod and capable of limited axial movement on the rod, spring means yieldably holding the tube, cup holder and cup in their extended position relative to the piston rod, a vacuum supply means connected to the interior of the tube, vacuum venting means comprising a port for establishing communication between the atmosphere and said vacuum supply means, a sleeve valve carried by said tube and movable thereon to a position to close said port, spring means normally holding said valve in such position, means for reciprocating the piston and piston rod to thereby move the chuck between article pick-up and transfer stations, and means for automatically moving said sleeve valve to open said port incident to positioning of the chuck at the transfer station.

3. Apparatus of the character described comprising a vacuum transfer chuck mounted for reciprocation horizontally between article pick-up and transfer stations, means for so moving the chuck, an endless series of cradles movable in succession between said transfer station and a discharge station spaced horizontally therefrom, each cradle being tiltable between a position to receive and support articles in a recumbent position at the transfer station and a position at the discharge station in which the articles are upright, a horizontal conveyor at the discharge station operable to remove the upright articles from the cradles, suction means connected to the chuck and means operable incident to positioning of the chuck at one end of the cradle to break the vacuum and permit gravity transfer of the article to the cradle.

4. Apparatus of the character described comprising a vacuum transfer chuck having its longitudinal axis extending horizontally, means for reciprocating the chuck axially between an article pick-up station and a transfer station, a cradle movable intermittently to and from said stations, said cradle facing upwardly at the transfer station and mounted for movement to an upright position while traveling to a discharge station whereby such cradle may receive and support an article in a recumbent position at the transfer station and then hold it upright at the discharge station, means for removing an article from the cradle at the discharge station, the chuck reciprocating means being a horizontal piston motor having its longitudinal axis in alignment with that of the chuck, a piston rod having a portion extending outwardly of the motor, the chuck being supported upon the free end of said piston rod, vacuum supply means connected to the chuck, and a valved opening for admitting atmospheric air to break the vacuum in said chuck incident to arrival of the latter at the transfer station.

References Cited in the file of this patent

UNITED STATES PATENTS

| | | |
|---|---|---|
| 1,325,527 | Mingle | Dec. 23, 1919 |
| 2,301,892 | Lewis | Nov. 10, 1942 |
| 2,355,597 | Pond | Aug. 8, 1944 |
| 2,635,662 | Doering et al. | Apr. 21, 1953 |
| 2,642,212 | Currivan | June 16, 1953 |